Figure 1:
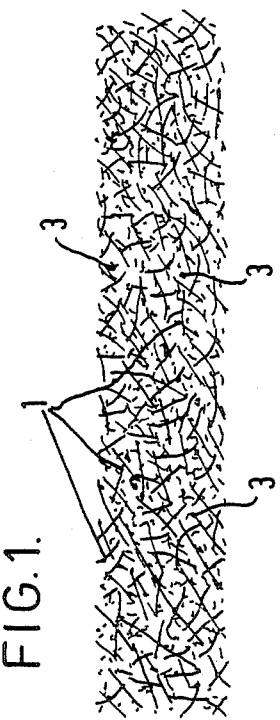

United States Patent [19]

Radvan et al.

[11] Patent Number: 4,734,321
[45] Date of Patent: Mar. 29, 1988

[54] FIBER REINFORCED PLASTICS STRUCTURES

[75] Inventors: Bronislaw Radvan, Flackwell Heath; Anthony J. Willis, Marlow, both of England

[73] Assignee: The Wiggins Teape Group Limited, Basingstoke, England

[21] Appl. No.: 946,167

[22] Filed: Dec. 23, 1986

Related U.S. Application Data

[63] Continuation of Ser. No. 689,000, Jan. 4, 1985, abandoned.

[30] Foreign Application Priority Data

Jan. 6, 1984 [GB] United Kingdom ................ 8400290

[51] Int. Cl.$^4$ ............................................. B32B 5/16
[52] U.S. Cl. ................................. 428/283; 156/62.2; 156/62.4; 156/242; 156/296; 162/145; 162/146; 162/156; 162/164.1; 162/164.7; 162/165; 162/168.1; 162/169; 428/288; 428/296; 428/297; 428/323; 428/327; 428/402; 428/902; 428/903
[58] Field of Search ...................... 156/62.2, 62.4, 296, 156/242; 162/145, 146, 156, 164.1, 168.1, 169, 165, 164.7; 428/283, 288, 297, 323, 327, 296, 902, 903, 402

[56] References Cited

U.S. PATENT DOCUMENTS

| | | | |
|---|---|---|---|
| 3,891,736 | 6/1975 | Shen | 264/101 |
| 4,178,411 | 12/1979 | Cole et al. | 428/310 |
| 4,362,778 | 12/1982 | Andersson et al. | 428/240 |
| 4,426,470 | 1/1984 | Wessling et al. | 524/35 |
| 4,440,819 | 4/1984 | Rossner et al. | 428/288 |
| 4,498,957 | 2/1985 | Sasaki et al. | 428/288 |
| 4,508,777 | 4/1985 | Yamamoto et al. | 428/288 |

FOREIGN PATENT DOCUMENTS 703023 1/1954 United Kingdom .
1008833 11/1965 United Kingdom .

OTHER PUBLICATIONS

EPO Appln. 0 173 382 A2–Mar. 5, 1986, Dow Chemical.
Turner & Cogswell, "Fibre-Foam", *Proceedings VIIth International Congress on Rheology*, 1977, pp. 172–173.

Primary Examiner—James J. Bell
Attorney, Agent, or Firm—Burns, Doane, Swecker & Mathis

[57] ABSTRACT

An air permeable sheet-like structure comprising 20% to 60% by weight of reinforcing fibers having a high modulus of elasticity (as herein defined), and being between about 7 and about 50 millimeters long, and 40% to 80% by weight of wholly or substantially unconsolidated particulate plastics material, and in which the fibrous and plastics components are bonded into an air permeable structure.

32 Claims, 5 Drawing Figures

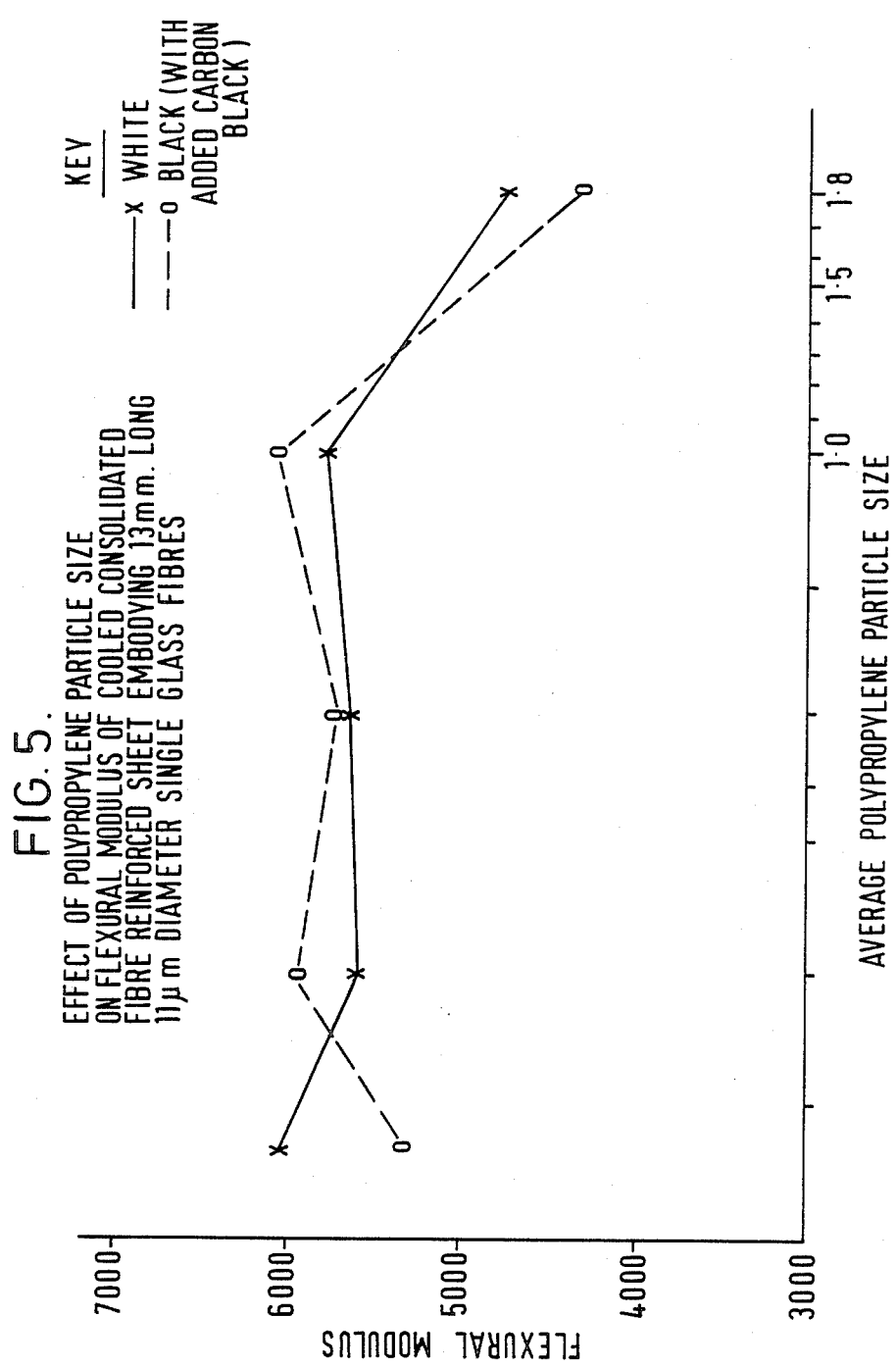

FIBER REINFORCED PLASTICS STRUCTURES

This application is a continuation of application Ser. No. 689,000, filed Jan. 4, 1985, now abandoned.

This invention relates to sheet-like fibrous structures, and in particular to such structures for use in the production of fibre reinforced plastics materials or articles. The invention also relates to a process for making such materials.

Plastics sheet materials made from thermoplastic resins are widely used in the manufacture of moulded articles. Such materials are, however, not of great strength or rigidity, and where such properties are required, fibre reinforcement is introduced.

Thus, for example, in the manufacture of one such material, layers of glass fibre mat are interposed between layers of thermoplastics material, the composite structure being needled to produce a degree of integration of the layers and then heated under pressure to produce consolidated rigid sheets for use in moulding.

However, for satisfactory moulding of such sheets, they must be homogeneously preheated. This requires both time and accurate temperature control if overheating and degradation of the sheet surfaces is not to occur whilst the core portions of the sheets are brought up to the required moulding temperature. Also, for a moulding of given dimensions, an optimum size of consolidated sheet is required if excessive waste in the form of flash is to be avoided. As a result a moulder who manufactures a wide range of mouldings must carry a corresponding range of sheet sizes, be prepared to cut large sheets to an appropriate size or accept a high degree of wastage.

Furthermore, when used for deep draw moulding it is found that such materials are not capable of being used to form mouldings of uniform structural strength. This is because the glass fibre mat is constituted of very long glass fibre strands (i.e. fibre bundles) of perhaps 200 centimeters or more which extend in a random serpentine manner throughout the whole sheet. This substantially restricts their movement during moulding in that they cannot flow with the thermoplastics material constituting the remainder of the structure. As a result, relatively thin parts of the moulding such as stiffening ribs are starved of fibre reinforcement. Additionally, because of the mode of manufacture of such reinforced sheets, they have to be fully consolidated by the application of heat and pressure in order to be transportable. As a result, they can only be supplied to the moulder as flat, impermeable and rigid sheets which are difficult to handle in a continuous moulding process.

It is among the objects of the present invention to provide a composite fibre and plastics material for use in the moulding of fibre reinforced plastics articles which overcomes or alleviates the disadvantages of known materials as described above.

The invention therefore provides an open sheet-like structure comprising from 20% to 60% by weight of reinforcing fibres having a high modulus of elasticity (as herein defined), and between about 7 and about 50 millimeters long, and from 40% to 80% by weight of wholly or substantially unconsolidated particulate plastics material the fibrous and plastics components being bonded into an air permeable structure.

Preferably, the fibres are in the form of single discrete fibres. Thus, where glass fibres are used, and are received in the form of chopped strand bundles, the bundles are broken down into single fibres before the structure is formed.

A high modulus of elasticity is to be taken as meaning a modulus of elasticity substantially higher than that of a consolidated sheet which could be formed from the structure. Fibres falling into this category include glass carbon and ceramic fibres and fibres such as the aramid fibres sold under the trade names Kevlar and Nomex and will generally include any fibre having a modulus higher than 10,000 Mega Pascals.

Particulate plastics material is to be taken as including short plastics fibres which may be included to enhance the cohesion of the structure during manufacture.

Bonding may be effected by utilizing the thermal characteristics of the plastics material within the structure. Thus the structure may be heated sufficiently to cause a thermoplastic component to fuse at its surfaces to adjacent particles and fibres. Or a post formable thermosetting component may be so heated to produce a similar effect. Care must be taken however to ensure that the conditions of heating are such as to prevent degradation of the plastics material after bonding.

Alternatively, a binder may be added during manufacture of the structure to effect bonding. Any binder may be used which will effect a bond at a lower temperature than that which would result in consolidation of the plastics material within the structure. Suitable binders include polyvinyl alcohol, polyvinyl acetate, carboxymethyl cellulose and starch.

Individual fibres should not be shorter than about 7 millimeters, since shorter fibres do not provide adequate reinforcement in the ultimate moulded article. Nor should they be longer than 50 millimeters since such fibres are difficult to handle in the preferred manufacturing process for the fibrous structure.

Preferably glass fibres are 13 microns in diameter or less. Fibre of diameters greater than 13 microns will not so efficiently reinforce the plastics matrix after moulding.

Preferably, the plastics material is in a particulate form and may be a thermoplastic, a thermosetting plastic or a mixture of the two. Suitable thermoplastics include polyethylene, polypropylene, polystyrene, acrylonitrylstyrene butadiene, polythylene terephthalate, and polyvinyl chloride, both plasticised and unplasticised. It is anticipated that any thermoplastics powder may be used which is not chemically attacked by water and which can be sufficiently softened by heat to permit fusing and/or moulding without being chemically decomposed.

Plastics powders need not be excessively fine, but particles coarser than about 1.5 millimeters, as exemplified by coarse sand or fine rice grains, are unsatisfactory in that they do not flow sufficiently during the moulding process to produce a homogeneous structure.

The use of larger particles results in a significant reduction in the flexurol modulus of the material when consolidated. Preferably the plastics particles are not more than 1 millimeters in size.

Because the structure is permeable, it is capable of being preheated by hot air permeation. This technique permits rapid homogeneous heating of the whole structure in a manner which is difficult to achieve with consolidated sheets.

Preferably, the degree of bonding is controlled to cohere the components whilst still retaining sufficient flexibility to permit the structure to be reeled. In the reeled condition, it can be transported readily for use by a moulder in a continuous preheating and moulding process. Alternatively, and to minimize material wastage, shaped elements may be cut, pressed or stamped from the structure and supplied to the moulder in a form permitting articles to be moulded with minimum flash to be disposed of. The residual material may be recycled through the forming process, and neither the moulder nor the manufacturer of the fibrous structure will be faced with the need to dispose of waste material.

Alternatively, the degree of bonding may be such as to produce a rigid, but still air permeable sheet where this will meet the moulder's requirements. This is effected by adjusting the amount of the degree of fusing of the thermoplastic, or the amount of binder added to achieve the desired effect, the adjustment depending on the kinds of thermoplastics or binders used.

The porosity of the structure permits the optional introduction of liquid thermosetting resin by surface coating or impregnation. Such resins must, of course, be of the slow curing or post formable kind so as to permit delivery to the moulder and moulding before curing occurs.

Typically, the moulder will first rapidly heat the structure to the moulding temperature of the thermoplastic component. The sheet will then be quickly transferred to the moulding press and pressed into the desired shape before the curing of the thermosetting resin is complete.

The impregnation may be complete, in which a dense article will result or it may be limited to the surface layers of the article. This may confer sufficient increase in stiffness over the original expanded thermoplastic, together with a sealed surface which prevents a further ingress of other fluids such as water or oil into the expanded central zone. An excess of liquid thermosetting materials on the surface may also be used to produce a very smooth glossy appearance which is desirable when the moulding is to be used as a substitute for sheet metal and which is very difficult to achieve with conventional fibre reinforced materials.

Thermosetting resins which may be used to impregnate the expanded thermoplastics sheet include phenolic and polyester resins, for example phenol-formaldehyde resin, urea and melamine formaldehyde resins, epoxy resins, unsaturated polyesters and polyurethanes. Post formable thermosetting materials may also be used.

In those cases where the moulder is only equipped to handle consolidated sheets, the fibrous structure may be consolidated by cutting into appropriate lengths and then heating and cooling under pressure. It will be appreciated that such consolidation can only be carried out when the plastics content of the sheet is wholly of thermoplastics material.

In another aspect, the invention provides a process for the manufacture of a permeable sheet-like fibrous structure, which includes forming a web with 20% to 60% of single discrete fibres having a high modulus of elasticity (as herein defined) and between 7 and 50 millimeters long, and 40% to 60% by weight of a wholly or substantially unconsolidated particulate plastics material, and then treating the web to bond the fibres and plastics material together.

Preferably, the web is formed by the process described in UK Pat. Nos. 1129757 and 1329409, which relate to methods of producing fibrous sheets on papermaking machinery. This process achieves a very uniform distribution of single fibres in the sheet, even when the fibres are much longer than can be handled in conventional papermaking machinery.

However, other web forming techniques may be used in certain circumstances. Thus, for example, such a structure may be formed by using a very low consistency dispersion of fibres and plastics powder, together with a binder, and forming the structure of a paper machine with an "uphill wire". Alternatively, the web may be formed with the aid of a Rotiformer (Registered Trade Mark).

The web of fibres and plastics powder may also be formed using a dry laying technique as described in UK Pat. No. 1424682. In this case, the binder may be applied by means of a spray or by dipping and draining the web after it has been formed.

In all cases however, after the web has been formed it is treated, usually by heating, to effect bonding without substantially consolidating the plastics particles held in the web. Slight metering may be effected to ensure that the structure produced has a constant thickness. However, pressure and temperature conditions must be less than those which would compact the web and consolidate any thermoplastic component or cure any thermosetting component which it may contain.

Optionally, where a customer is only equipped to handle consolidated sheets, and the plastics content of the fibrous structure is wholly of thermoplastics material, the structure is cut into required lengths, after which it is subjected to heating and cooling under pressure to effect consolidation.

Figure 2:
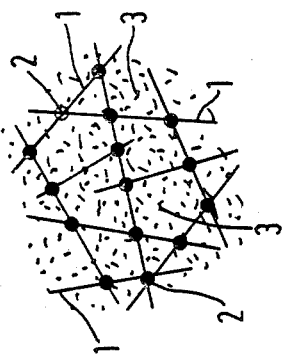
Figure 3:
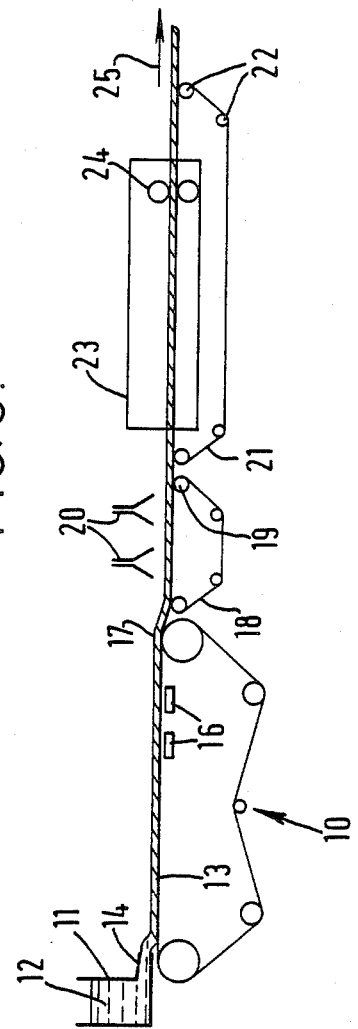
Figure 4:
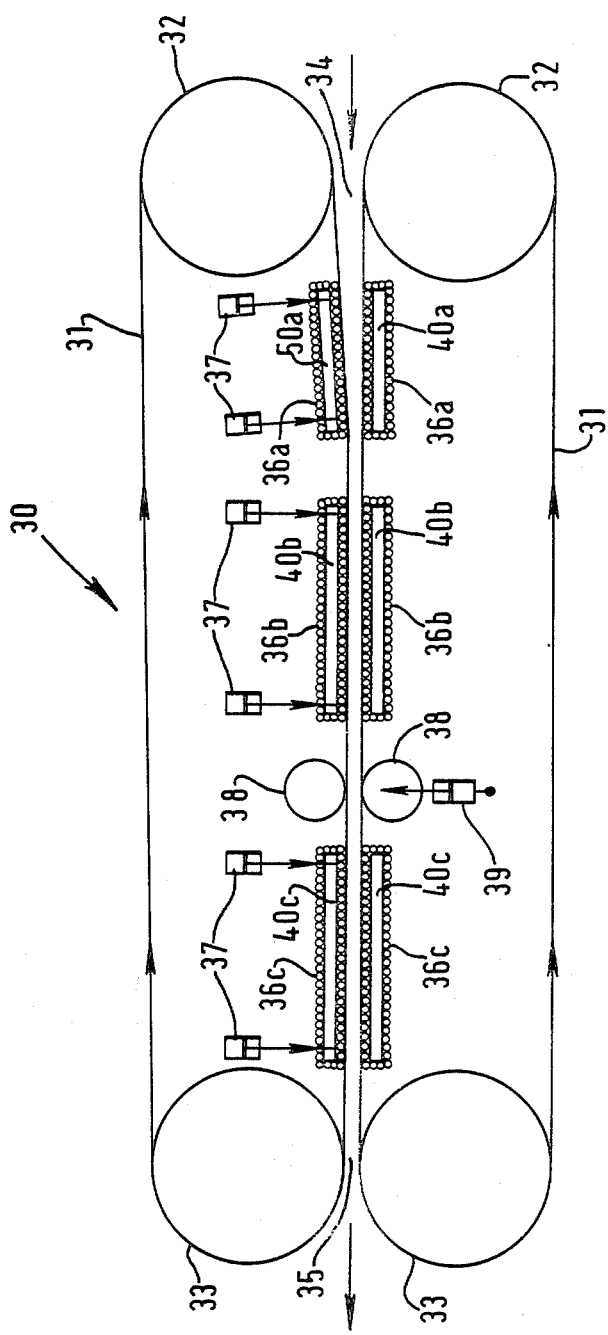

The invention will now be further described with reference to the accompanying drawings in which:

FIG. 1 is a diagrammatic cross-section of part of a fibrous structure according to the invention, FIG. 2 is a diagrammatic microscopic view of part of the fibrous structure of FIG. 1, and FIG. 3 is a diagrammatic side elevation of an apparatus for carrying out the preferred process of the invention, FIG. 4 is a diagrammatic side elevation of an apparatus for optionally carrying out an additional process step, and FIG. 5 is a graph illustrating a feature of the invention.

Referring first to FIGS. 1 and 2, this shows an uncompacted fibrous structure comprising fibres 1 bonded together at their points of intersection 2 by a binder so as to form a skeletal structure within the interstices of which a particulate plastics material 3 is also retained by the binder.

Typically, the fibres are glass fibres 12 millimeters long and 11 microns in diameter, the binder is polyvinyl alcohol and the plastics material is polypropylene particles.

Referring to FIG. 3, this shows an apparatus for making a fibrous structure according to the preferred method of the invention. There is shown at 10, the wet end of a Fourdrinier type papermaking machine including a headbox 11 which contains a dispersion 12. The dispersion 12 consists of glass fibres and particulate polypropylene in a foamed aqueous medium. A suitable foaming agent consists of sodium dodecylbenzene sulphonate at a concentration of 0.8% in water.

After drainage on the Fourdrinier wire 13 with the aid of suction boxes 16, a web 17 is formed of unbonded glass fibres interspersed with polypropylene particles. This is carefully transferred from the Fourdrinier wire 13 to a short endless wire mesh belt 18 tensioned around rollers 19. The belt 18 carries the web 17 under sprays 20 which apply liquid binder. Optionally, the binder may be applied by means of a curtain coater of known design. The web is then transferred to an endless travelling band 21 of stainless steel tensioned around rollers 22 and which carries the web through a drying tunnel 23. This causes residual moisture to be driven off and the binder to bond the fibres together. Towards the end of the drying tunnel, the web 17 is taken through a pair of rolls 24, whose function is to control the thickness of the resulting fibrous structure without applying pressure. The resulting sheet material is then taken in the direction of the arrow 25 for reeling.

Means for optionally consolidating the material produced as described above are shown in FIG. 4. This shows a continuous hot press of the steel band type (Sandvik Conveyors Ltd.) which may be employed to consolidate material received directly from the rolls 24 or material which has already been reeled. The press is shown at 30 in FIG. 4 wherein a pair of travelling endless steel bands 31 are each retained around a pair of rotating drums 32 and 33. The separation between the pair of bands 31 decreases from the inlet 34 to the outlet 35 and defines a passage, through which the web (not shown) is conveyed from right to left. Between drums 32 and 33 there are provided six sets of roller chains 36a, 36b and 36c arranged in pairs on opposite sides of the passage adjacent the bands 31. The lower sets of chains 36a, 36b and 36c are fixed but the upper sets are reciprocally mounted and connected to hydraulic rams 37. In this way, each pair of chains 36a, 36b and 36c serves to guide and maintain the bands 31 in position and also to consolidate the web whilst being conveyed through the passage. Between chains 36b and 36c, there are provided two nip rolls 38 which are disposed on opposite sides of the passage adjacent the bands 31; the lower roll being supported by a hydraulic jack 39. These rolls 38 further assist in the consolidation of the web. Within the sets of chains 36a and 36b are heating platens 40a and 40b which heat the bands 31 and in turn the web whilst cooling platens 40c are disposed within the set of chains 36c.

Further advantages of the present invention will become apparent from the following examples.

EXAMPLE 1

12 kg of polypropylene powder (PXC 8609 grade made by I.C.I. Ltd.) and 4 kg of glass fibre (E.C. grade, 13 $\mu$m diameter, 12 mm long, were mixed with 1600 liters of water in a froth flotation cell (Denver Equipment Co.) as described in U.K. Pat. Nos. 1 129 757 and 1 329 409. Sufficient foaming agent (sodium dodecyl benzene sulphonate) was added to produce a fine bubbled foam with an air content of approximately 67% by volume. The foamed dispersion was then transferred to the headbox 11 of the apparatus shown in FIG. 3.

The suspension was deposited onto the Fourdrinier wire 13 of a paper machine, and the water drained using the suction boxes 16. The fibrous web was transferred onto the endless band 21 of polyester via the belt 18, but without the application of binder, then dried in the tunnel drier 23 at 105° C. and reeled up.

A continuous hot press of the type shown in FIG. 4 was heated to a temperature of 160° C. in the drum 32, rising to 200° C. in the heating platens 40a, and to 270° C. in the heating platens 40b. Cold water was circulated through the cooling platens 40c so as to maintain their temperature at 20° C. The separation between the bands 31 was set at 5 mm at the inlet 34, decreasing to 2.3 mm at the outlet 35. The reeled fibrous web was fed in at the inlet 34 at a speed of 2.5 m/min, and emerged fully consolidated, with a flat smooth surface. The ultimate tensile strength of this material was measured as 60 MNm$-2$.

EXAMPLE 2

A continuous web of 50% chopped strand glass fibre 11 $\mu$m diameter and 13 millimeters long and 50% powdered polypropylene by weight were used to prepare a foamed dispersion generally as described in Example 1. This dispersion was then used to form a web on the wet end of a 1.1 meter wide paper-making machine. The 450 g/m$^2$ moist web was produced at a speed of 8 m/min and impregnated by coating on the wire 18 with a 1% polyvinyl alcohol solution to act as a binder. The web was then passed directly into a tunnel dryer 23. The first section of the dryer was set at 105° C. in order to gently dry the web, although the subsequent three sections were set to 150°-160° C. i.e. below the melting point of the polypropylene. The emerging material, consisting of polypropylene particles retained in a web of separate glass fibres bonded together had sufficient strength to be reeled up and could be transported without disintegration or serious loss of polypropylene powder.

The reels of material were cut into 1.8 meters$\times$0.8 meters sheets. The sheets were laminated five at a time, at a speed of 1.6 m/min in a continuous double belt press (made by Sandvik, Fellbach, West Germany). The first zone of the machine was 2.6 meters long and oil heated to 300° C. (the sample temperature (210°-220° C.); the pressure applied to the samples was 3 bar. The second zone of the machine was water cooled at a pressure of 2 bar. The rigid fully consolidated sheets emerged at about 80° C., having passed through a phase where all the air had been expelled from the porous web (corresponding to a density of 1.33 g/cm$^3$). These sheets were capable of moulding into semi-finished articles.

EXAMPLE 3

The process of Example 1 was carried out until the web was deposited on the endless band 21. A binder consisting of acrylic latex diluted to 0.75% solids was then applied by means of a conventional curtain coater (not shown) onto the moving web. Excess latex solution was drawn through the web and recirculated. The web had a substance of 500 grams per square meter and 33 liters per meter of latex was applied as the web moved at 9 meters per minute on the endless band, 2 liters being retained in each 9 meter length of the web.

Table 1 lists Examples 4 to 10 in which sheets were prepared generally in accordance with the process described in Example 1 using the various fibres specified in a matrix formed of polypropylene particles of less than 1 millimeter in size.

Table 2 lists Examples 11 to 21 in which sheets were prepared generally in accordance with the process described in Example 1 using a variety of fibres in matrixes formed from three differing thermoplastic polymers.

The various Examples demonstrate the versatility of the invention and its applicability for use with a wide range of reinforcing fibres and thermoplastics.

FIG. 5 is a graph demonstrating the effect of thermoplastic particle size on the flexural modulus of consolidated sheets, the horizontal axis not being to a consistent scale for clarity of illustration. The graph shows that the flexural modulus begins to fall when the particle size is larger than 1 millimeter. Beyond 1.5 millimeters in size the flexural modulus deteriorates significantly.

TABLE 1
THE EFFECT OF VARIOUS REINFORCING FIBRES ON A COOLED POLYPROYLENE MATRIX AFTER CONSOLIDATION UNDER HEAT AND PRESSURE

| Example | % Fibre Component | Grammage (g/m$^2$) | Density (g/cc) | Tensile Strength (MPa) | Flexural Modulus (MPa) | Flexural Strength (MPa) | Charpy Notched Impact (kJ/m$^2$) |
|---|---|---|---|---|---|---|---|
| 4 | 8% vol. (20% wt.) Glass | 2415 | 0.99 | 47 | 3425 | 59 | 14.6 |
| 5 | 19% vol. (40% wt.) Glass | 2705 | 1.15 | 72 | 5215 | 79 | 8.6 |
| 6 | 35% vol. (60% wt.) Glass | 3130 | 1.38 | 75 | 7475 | 78 | 13.4 |
| 7 | 8% vol. (15% wt.) Carbon | 2480 | 0.95 | 83 | 6290 | 97 | 18.0 |
| 8 | 35% vol. (52% wt.) Carbon | 2960 | 1.10 | 145 | 13 630 | 101 | 32.5 |
| 9 | 8% vol. (12% wt.) Aramid | 2175 | 0.96 | 50 | 2480 | 35 | 26.9 |
| 10 | 35% vol. (46% wt.) Aramid | 2915 | 1.01 | 145 | 6130 | 94 | >75 |

Notes:
1. Glass - Owens Corning R18D
2. Carbon - Courtauld Hysol Grafil 8821/1
3. Aramid - Dupong Kevlar K29
4. Polypropylene - Hoechst Hostalen PP.1402
vol = by volume
wt. = by weight
g/m$^2$ = grams per square meter
g/cc = grams per cubic centimeter
MPa = Mega Pascals
kJ/m$^2$ = Kilo Joules per square meter
mm = milimeters
μm = microns

| FIBRE LENGTH | FIBRE DIAMETER | FIBRE DENSITY |
|---|---|---|
| (13 mm, | 11 μm, | 2.55 g/cc) |
| (15 mm, | 8 μm, | 1.8 g/cc) |
| (12 mm, | 12 μm, | 1.44 g/cc) |

TABLE 2
EFFECT OF USING THERMOPLASTICS OTHER THAN POLYPROPYLENE

| Example | Composite | Grammage (g/m$^2$) | Tensile Strength (MPa) | Flexural Modulus (MPa) |
|---|---|---|---|---|
| 11 | 20% wt glass in PET | 3000 | 74 | 6100 |
| 12 | 20% wt carbon in PET | 2075 | 121 | 10860 |
| 13 | 40% wt glass in PET | 3000 | 150 | 10700 |
| 14 | 20% wt glass in PPO | 2500 | 76 | 4300 |
| 15 | 40% glass in PPO | 2500 | 116 | 7000 |
| 16 | 50% wt glass in PPO | 2500 | 147 | 8600 |
| 17 | 15% wt carbon in PPO | 2025 | 79 | 6750 |
| 18 | 20% wt carbon in PPO | 2115 | 118 | 9900 |
| 19 | 32% wt carbon in PBT | 1850 | 144 | 18890 |
| 20 | 28% wt glass / 10% wt carbon in PBT | 1890 | 155 | 13530 |
| 21 | 40% wt glass in PBT | 1940 | 117 | 10290 |

PET = Polyethylene Terephthalate
PBT = Polybutylene Terephthalate sold as 'Orgator TMNO' by Atochem UK
PPO = Polyphenylene Oxide sold as 'Noryl' by General Electric
Units and fibre dimensions as in Table 1

EXAMPLE 22

A polypropylene slurry was prepared by dispersing particulate polyproylene having a particle size of less than 1 millimeter in water at 25% solids content in a high shear mixer with a dispersing agent sold under the trade name 'Carterfix' supplied by Sondoz.

The resulting slurry was then further diluted to 7% solids and supplied to the inlet of a fan pump feeding stack to a Rotiformer (Registered Trade Mark). Singe glass fibres 11 micron diameter, 13 millimeters long were simultaneously fed to the fan pump inlet at a ratio of 40% by weight of the polypropylene.

The sheet formed on the Rotiformer was then spray treated with an acrylic latex binder diluted to 0.75% solids and reeled up. When subsequently consolidated, the sheet was seen to have a poorer formation than the sheets of Examples 1 and 2, although still acceptable. When consolidated the sheet had a substance of 562 grams per square meter on average (as between machine and cross directions) flexural modulus of 6603 Mega Pascals and tensile strength of 53 Mega Pascals.

When the sheets remain permeable they can be subsequently moulded to shape by heating to a moulding temperature by the passage of hot air through the sheet and then subjecting it to a moulding process as described in the applicants co-pending United Kingdom Patent Application No. 84 00292 filed Jan. 1984.

We claim:

1. An air permeable sheet-like structure consisting essentially of 20% to 60% by weight of single discrete reinforcing fibres having a modulus of elasticity higher than 10,000 mega pascals, and being between about 7 and about 50 millimeters long, and 40% to 80% by weight of unconsolidated particulate plastics material, selected from the group consisting of a thermoplastic and a thermosetting plastic material, the particulate plastics material having a particle size less than about 1.5 millimeters, and in which the fibrous and plastics components are bonded into an air permeable structure with the particulate plastics material retaining its particulate form in the air permeable structure.

2. An air permeable sheet like structure as claimed in claim 1 in which the particulate plastics material includes plastics material fibres.

3. An air permeable sheet like structure as claimed in claim 1 in which the components are bonded together by surface fusion of the particulate plastics material.

4. An air permeable sheet like structure comprising 20% to 60% by weight of single discrete reinforcing fibres having a modulus of elasticity higher than 10,000 mega pascals, and being between about 7 and about 50 millimeters long, and 40% to 80% by weight of unconsolidated particulate plastics material, selected from the group consisting of a thermoplastic and a thermosetting plastic material, the particulate plastics material having a particle size less than about 1.5 millimeters, and in which the fibrous and plastics components are bonded into an air permeable structure with the particulate plastics material retaining its particulate form in the air permeable structure, in which the components are bonded together by a binder, in which the binder is selected from the group consisting of polyvinyl alcohol, polyvinyl acetate, carboxymethyl cellulose and starch.

5. An air permeable sheet like structure as claimed in claim 1 in which the fibres are glass fibres having a diameter of 13 microns or less.

6. An air permeable sheet like structure as claimed in claim 1 in which the plastics material is selected from the group consisting of a thermoplastic and a thermosetting plastic.

7. An air permeable sheet like structure as claimed in claim 6 in which the plastics material is a thermoplastic material and is selected from the group consisting of polyethylene, polypropylene, polystyrene, acrylonitrylstyrene butadiene, polyethylene terephthalate, and polyvinyl chloride.

8. An air permeable sheet like structure as claimed in claim 1 in which particles constituting the particulate plastics material are smaller than about 1.5 millimeters in size.

9. An air permeable sheet like structure as claimed in claim 8 in which the particles constituting the particulate plastics material are smaller than about 1 millimeter in size.

10. An air permeable sheet like structure as claimed in claim 1 in which the degree of bonding is controlled to cohere the components while still retaining sufficient flexibility to permit the structure to be reeled.

11. An air permeable sheet like structure as claimed in claim 1 in which the degree of bonding is controlled to produce a rigid but air permeable sheet.

12. An air permeable sheet like structure as claimed in claim 1 which has been coated or impregnated with a liquid thermosetting resin.

13. An air permeable sheet like structure as claimed in claim 12 in which said thermosetting resin is selected from the group consisting of phenolic and polyester resins.

14. An air permeable sheet like structure as claimed in claim 13 in which the resins are selected from the group consisting of phenol-formaldehyde resin, urea and melamine formaldehyde resins, epoxy resins, unsaturated polyesters and polyurethanes.

15. An air permeable sheet like structure as claimed in claim 5, in which the plastics material comprises a mixture of thermoplastic and thermosetting plastic.

16. An air permeable sheet like structure as claimed in claim 6 in which the plastics material is plasticised.

17. A process for the manufacture of a permeable sheet like fibrous structure which consists essentially of forming a web with 20% to 60% of single discrete fibres having a modulus of elasticity higher than 10,000 mega pascals, and between 7 and 50 millimeters long, and 40% to 60% by weight of unconsolidated particulate plastics material selected from the group consisting of a thermoplastic and a thermosetting plastic material, the particulate plastics material having a particle size less than about 1.5 millimeters, and then treating the web to bond the fibres and plastics material together while maintaining the particulate form of the plastic material.

18. A process as claimed in claim 17 in which the particulate plastics material includes short plastics material fibres.

19. A process as claimed in claim 17 in which the components are bonded together by surface fusion of the particulate plastics material.

20. A process as claimed in claim 17 in which the components are bonded together by a binder added during formation of the web.

21. A process as claimed in claim 20 in which the binder is selected from the group consisting of polyvinyl alcohol, polyvinyl acetate, carboxymethyl cellulose and starch.

22. A process as claimed in claim 17 in which the fibres are glass fibres having a diameter smaller than about 13 microns.

23. A process as claimed in claim 17 in which the plastics material is selected from the group consisting of a thermoplastic and a thermosetting plastic.

24. A process as claimed in claim 23 in which the plastics material is a thermoplastic material and is selected from the group consisting of polyethylene, polypropylene, polystyrene, acrylonitrylstyrene butadiene, polyethylene terephthalate, and polyvinyl chloride, both plasticised and unplasticised.

25. A process as claimed in claim 17 in which the degree of bonding is controlled to cohere the components while still retaining sufficient flexibility to permit the structure to be reeled.

26. A process as claimed in claim 17 in which the degree of bonding is controlled to produce a rigid but air permeable sheet.

27. A process as claimed in claim 17 in which the permeable sheet like structure is coated or impregnated with a liquid thermosetting resin.

28. A process as claimed in claim 27 in which the said thermosetting resin includes phenolic and polyester resins.

29. A process as claimed in claim 17 in which the web is made using a dry laying technique and a binder is applied after the web has been formed.

30. A process as claimed in claim 17 in which the plastics content of the fibrous structure is wholly of thermoplastics material and the structure is subjected to heating and cooling under pressure to effect consolidation.

31. A process as claimed in claim 17 in which the sheet is subsequently moulded to a predetermined shape.

32. A process as claimed in claim 17 which includes forming the web on a paper making machine.

* * * * *